United States Patent
Wilson

(10) Patent No.: US 10,318,115 B2
(45) Date of Patent: Jun. 11, 2019

(54) SYSTEM AND METHOD FOR PRESENTING OPTIMIZED MAP LABELS

(71) Applicant: OneMarket Network LLC, San Francisco, CA (US)

(72) Inventor: James Arthur Wilson, San Francisco, CA (US)

(73) Assignee: OneMarket Network LLC, San Francisco, CA (US)

( * ) Notice: Subject to any disclaimer, the term of this patent is extended or adjusted under 35 U.S.C. 154(b) by 80 days.

(21) Appl. No.: 15/340,666

(22) Filed: Nov. 1, 2016

(65) Prior Publication Data

US 2018/0107346 A1   Apr. 19, 2018

Related U.S. Application Data

(60) Provisional application No. 62/408,619, filed on Oct. 14, 2016.

(51) Int. Cl.

| | |
|---|---|
| *G06Q 30/02* | (2012.01) |
| *G06F 3/0482* | (2013.01) |
| *G06F 16/29* | (2019.01) |
| *G06F 16/248* | (2019.01) |
| *G06F 16/23* | (2019.01) |

(Continued)

(52) U.S. Cl.
CPC ....... *G06F 3/0482* (2013.01); *G01C 21/3673* (2013.01); *G06F 16/2365* (2019.01); *G06F 16/248* (2019.01); *G06F 16/24578* (2019.01); *G06F 16/29* (2019.01); *G06T 11/60* (2013.01); *G09G 2340/14* (2013.01)

(58) Field of Classification Search
CPC ......... G06F 17/30241; G06F 17/30371; G06F 17/3053; G06F 17/30554; G06F 16/29; G06F 16/248; G06F 16/2365; G06F 16/24578; G06F 3/0482; G01C 21/3673; G06T 11/60; G09G 2340/14
USPC ........................................................ 715/745
See application file for complete search history.

(56) References Cited

U.S. PATENT DOCUMENTS 9,410,815 B1 *   8/2016   Hirano ............... G01C 21/3407
2010/0211909 A1   8/2010   Ghanekar et al.
(Continued)

FOREIGN PATENT DOCUMENTS

WO   2018071246 A1   4/2018

OTHER PUBLICATIONS

"Int'l Application Serial No. PCT/US17/55084, Int'l Search Report and Written Opinion dated Dec. 22, 2017", 13 pages.

*Primary Examiner* — Scott T Baderman
*Assistant Examiner* — Hassan Mrabi
(74) *Attorney, Agent, or Firm* — Kwan & Olynick LLP

(57) ABSTRACT

Disclosed are systems, methods, and devices for presenting map labels. In one embodiment, the method comprises receiving map data and location data; retrieving a user profile, the user profile containing a list of locations; generating a plurality of labels, wherein the plurality of labels comprise labels associated with a subset of locations within the list of locations; identifying one or more conflicting labels, wherein the one or more conflicting labels comprise one or more overlapping labels; ranking the one or more labels based on the user profile to generate a ranked label subset, wherein labels in the ranked label subset comprise non-overlapping labels; and displaying the map data and the ranked label subset.

16 Claims, 5 Drawing Sheets

(51) Int. Cl.
 *G06F 16/2457* (2019.01)
 *G01C 21/36* (2006.01)
 *G06T 11/60* (2006.01)

(56) References Cited

U.S. PATENT DOCUMENTS

| | | |
|---|---|---|
| 2011/0208724 A1 | 8/2011 | Jones et al. |
| 2011/0270517 A1* | 11/2011 | Benedetti ............... G01C 21/20 |
| | | 701/533 |
| 2014/0101604 A1* | 4/2014 | Han ...................... G06F 3/0487 |
| | | 715/798 |
| 2014/0192056 A1* | 7/2014 | Bailiang ............... G06T 11/206 |
| | | 345/440 |
| 2014/0340419 A1* | 11/2014 | Otero ........................ G06T 9/00 |
| | | 345/619 |
| 2014/0340421 A1* | 11/2014 | Otero ..................... G06T 11/20 |
| | | 345/619 |
| 2015/0116358 A1* | 4/2015 | Choi ........................ G06T 9/00 |
| | | 345/633 |
| 2015/0161167 A1 | 6/2015 | Sung et al. |
| 2015/0187337 A1 | 7/2015 | Baxter et al. |

\* cited by examiner

SYSTEM AND METHOD FOR PRESENTING OPTIMIZED MAP LABELS

CLAIM OF PRIORITY

The present application claims the benefit of the filing date of Prov. U.S. patent application Ser. No. 62/408,619, filed on Oct. 14, 2016, the entire disclosure of which application is hereby incorporated herein by reference.

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever

BACKGROUND

Currently, many systems have been developed to provide map-related data to users. Users can now access map-related data on desktop computers, dedicated GPS devices, and most recently, mobile computing devices (e.g., mobile phones, tablets, smart watches). Each of these devices generally display a traditional map (e.g., a display with cities, roads, etc.) in various formats. For example, mobile devices may present a matrix of map tiles, each tile representing a portion of the map. Current systems allow users to "zoom" in and out of map in order to view larger or smaller areas in less or more detail, respectively. To enable zooming, current systems present tiles of various sizes in order to respond to the requested zoom level.

While early systems focused primarily on driving directions, and thus primarily provided road-level detail, current systems provide additional detail. For example, popular web-based and mobile map applications provide both road detail as well as location-based detail such as businesses, building outlines, and supplemental content from third-party websites (e.g., "reviews" for restaurants).

Notably however, as the amount of information presented in mapping applications continues to increase, the screen "real estate" available for these applications generally either remains constant or grows smaller (in the case of mobile devices). Because of these constraints, mapping applications attempt to filter non-map data (e.g., business data) in order to maximize the use of screen real estate.

One primary technique currently used is to limit the display of business data based on the zoom level and the size of the business (e.g., the square footage of the store). This decision is made based on two factors. First, larger square footage businesses tend to result in expansive "empty" space in a map. Thus adding, for example, the name of the business incurs little or no penalty, even when the map is zoomed out. Second, larger square footage businesses tend to have broader appeal. For example, a nation-wide retailer of general goods has broader appeal than a smaller, specialty store.

However, this technique suffers from the principle drawback of only providing mediocre results to the largest possible number of people. Additionally, current techniques inherently utilize significant amounts of memory in order to provide data that may ultimately be of little use to the user. Especially in mobile computing devices, this overutilization of memory necessarily degrades the performance of the computing device by degrading the performance of the mapping application as well as parasitically degrading the functionality of other applications running on the computing device.

Thus, there exists a need in the art to optimize and personalize the display of content such as labels on a map. Specifically, there exists a need to optimize memory utilization by mapping applications and provide personalized content to users of mapping applications.

BRIEF SUMMARY

To remedy the aforementioned deficiencies, the disclosure presents systems, methods, and devices for personalizing the display of map content based on user preferences.

In one embodiment, the disclosure describes a method for presenting map labels. In this embodiment, the method comprises receiving map data and location data; retrieving a user profile, the user profile containing a list of locations; generating a plurality of labels, wherein the plurality of labels comprise labels associated with a subset of locations within the list of locations; identifying one or more conflicting labels, wherein the one or more conflicting labels comprise one or more overlapping labels; ranking the one or more labels based on the user profile to generate a ranked label subset, wherein labels in the ranked label subset comprise non-overlapping labels; and displaying the map data and the ranked label subset.

In one embodiment, the disclosure describes a device for presenting map labels. In this embodiment, the device comprises one or more processors and a non-transitory memory storing computer-executable instructions therein that, when executed by the processors, cause the device to receive map data and location data; retrieve a user profile, the user profile containing a list of locations; generate a plurality of labels, wherein the plurality of labels comprise labels associated with a subset of locations within the list of locations; identify one or more conflicting labels, wherein the one or more conflicting labels comprise one or more overlapping labels; rank the one or more labels based on the user profile to generate a ranked label subset, wherein labels in the ranked label subset comprise non-overlapping labels; and display the map data and the ranked label subset.

In one embodiment, the disclosure describes a system for presenting map labels. In this embodiment, the system comprises a user device configured to receive map data and location data; retrieve a user profile, the user profile containing a list of locations; generate a plurality of labels, wherein the plurality of labels comprise labels associated with a subset of locations within the list of locations; identify one or more conflicting labels, wherein the one or more conflicting labels comprise one or more overlapping labels; rank the one or more labels based on the user profile to generate a ranked label subset, wherein labels in the ranked label subset comprise non-overlapping labels; and display the map data and the ranked label subset. The system further comprises a user profile processor configured to generate an initial user profile; receive one or more user preferences and updating the initial user profile based on the one or more user preferences to generate the user profile; receive activity data in response to receiving a notification that an activity has occurred; generate a synthesized profile data point based on the activity data; and update the user profile based on the synthesized profile data point.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
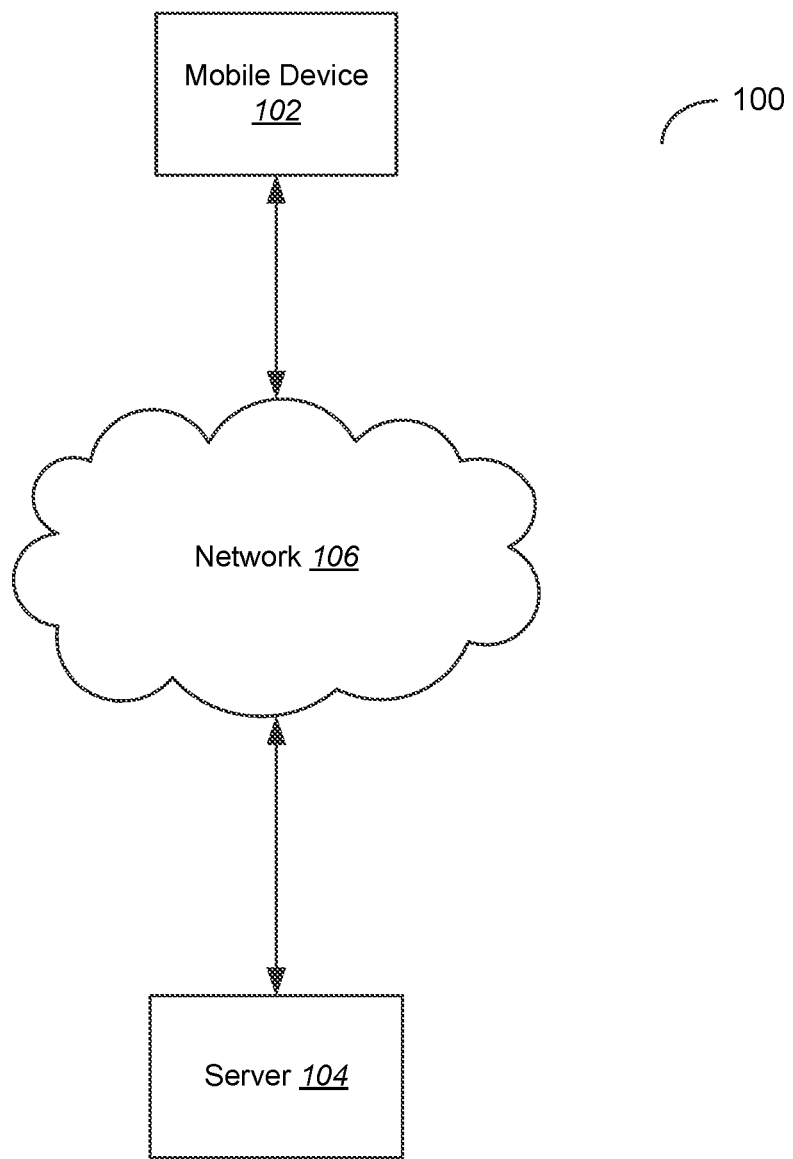
FIG. 1 is a network diagram illustrating a system for presenting map labels according to some embodiments of the disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like (including any future radio, satellite, or otherwise wireless network access technologies). Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

FIG. 1 is a network diagram illustrating a system for presenting map labels according to some embodiments of the disclosure. As illustrated in FIG. 1, the system 100 includes a mobile device 102, server 104, and network 106.

As illustrated in FIG. 1, a mobile device 102 may comprise a computing device designed to be carried by a user. In one embodiment, the mobile device 102 may include a device such as the one illustrated in FIG. 2. The mobile device 102 may be configured to collect data generated by various hardware components present within the mobile device 102, such as GPS receivers, accelerometers, gyroscopes, or other devices capable of recording data regarding the movement or activity of the mobile device 102. Additionally, mobile device 102 may be configured to display map data (e.g., map tiles) in response to a user request to view a map. In addition to geographic detail, mobile device 102 may further be configured to display labels and other information as an "overlay" of the map data.

As discussed in more detail herein, mobile device 102 may further include processing logic (e.g., a CPU) capable of receiving and processing movement or location data. In some embodiments, the mobile device 102 may specifically be configured to receive data and pre-process data prior to transmittal. In addition to recording and processing data, mobile device 102 may further be configured to transmit data, including location and event data, to other devices via network 106.

Although illustrated as a single network, network 106 may comprise multiple networks facilitating communication between devices. In one embodiment, the network 106 may include a wireless fidelity ("Wi-Fi") network as defined by the IEEE 802.11 standards or equivalent standards. In this embodiment, the network 106 may enable the transfer of location or event data from mobile device 102 to server 104. In an alternative embodiment, the network 106 may comprise a mobile network such as a cellular network. In this embodiment, data may be transferred between the illustrated devices in a manner similar to the embodiment wherein the network 106 is a Wi-Fi network. While described in isolation, network 106 may include multiple networks.

Figure 3:
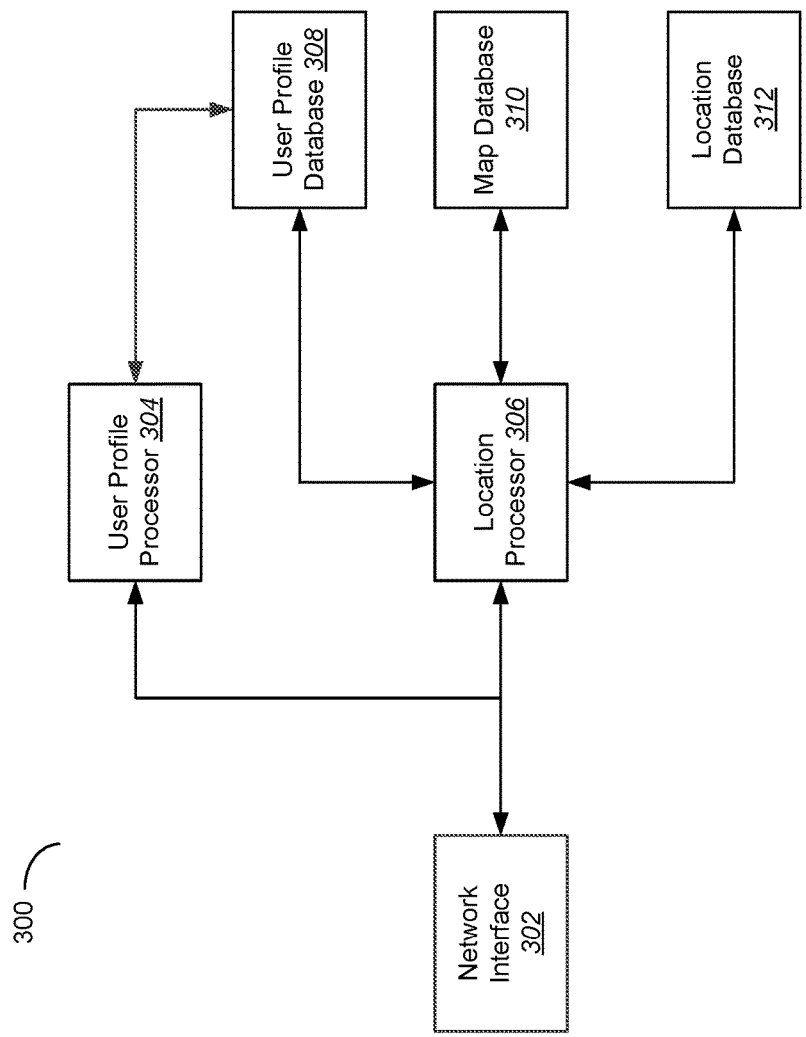
FIG. 3 is a logical block diagram illustrating a server device for presenting map labels according to some embodiments of the disclosure.

As discussed in more detail with respect to FIG. 3, server 104 may be configured to receive requests from mobile device 102 and provide responses to such requests. In one embodiment, server 104 may be configured to receive requests for map data from a mobile device 102 and provide map data in response. Alternatively, or in conjunction with the foregoing, server 104 may be configured to receive user profile information and store user profile information in one or more databases. Alternatively, or in conjunction with the foregoing, server 104 may be configured to update user profile data based on activity data received from mobile device 102 or third party sources (not illustrated). Alternatively, or in conjunction with the foregoing, server 104 may be configured to provide location details to user device 102.

Figure 2:
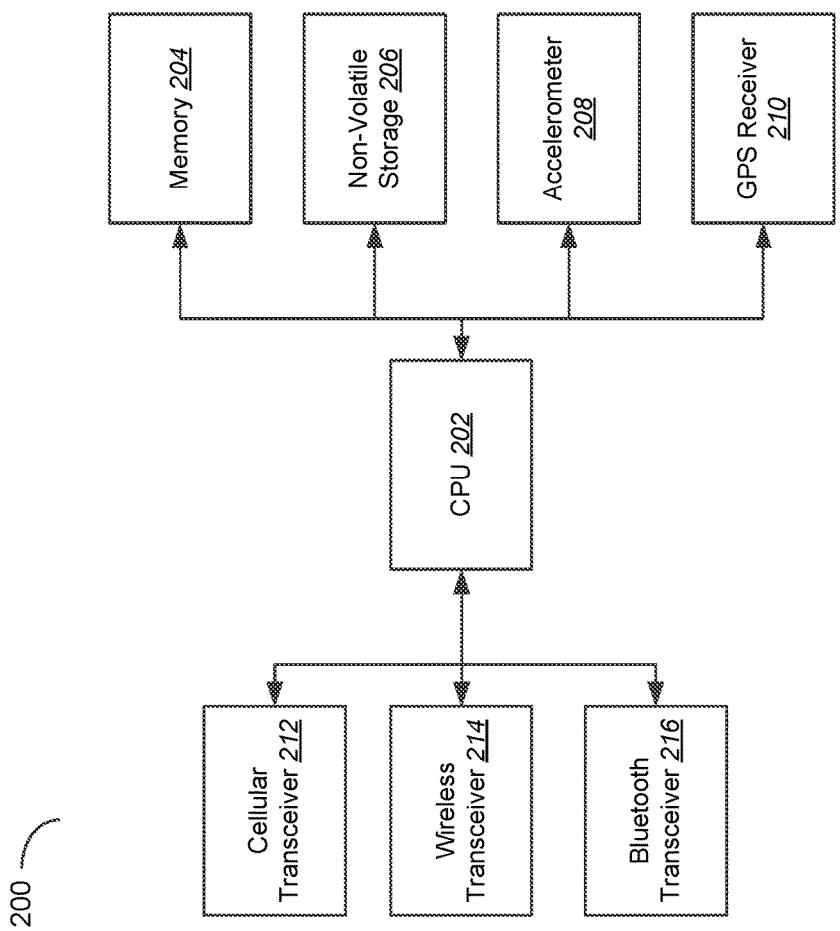
FIG. 2 is a physical diagram illustrating a mobile device for presenting map labels according to some embodiments of the disclosure.

FIG. 2 is a physical diagram illustrating a mobile device for presenting map labels according to some embodiments of the disclosure. The device 200 includes CPU 202, memory 204, non-volatile storage 206, accelerometer 208, GPS receiver 210, cellular transceiver 212, Bluetooth transceiver 216, and wireless transceiver 214.

The device 200 includes an accelerometer 208 and GPS receiver 210 which monitor the device 200 to identify its position (via GPS receiver 210) and its acceleration (via accelerometer 208). Although illustrated as a single component, accelerometer 208 and GPS receiver 210 may alternatively each include multiple components providing similar functionality. Alternatively, or in conjunction with the foregoing, the device 200 may include a Bluetooth transceiver (illustrated in more detail in connection with FIG. 2) configured to track the position of a device using, for example, low-energy Bluetooth beacons (e.g., using protocols such as the iBeacon protocol or similar protocols).

Accelerometer 208 and GPS receiver 210 generate data as described in more detail herein and transmits the data to other components via CPU 202. Alternatively, or in conjunction with the foregoing, accelerometer 208 and GPS receiver 210 may transmit data to memory 204 for short-term storage.

In one embodiment, memory 204 may comprise a random access memory device or similar volatile storage device. In this embodiment, CPU 202 may access the data (e.g., location and/or event data) from memory 204. Alternatively, or in conjunction with the foregoing, accelerometer 208 and GPS receiver 210 may transmit data directly to non-volatile storage 206. Alternatively, or in conjunction with the foregoing, CPU 202 may be configured to receive data (e.g., position data received using a beacon protocol) from a Bluetooth transceiver. In some embodiments, non-volatile storage 206 may comprise a solid-state storage device (e.g., a "flash" storage device) or a traditional storage device (e.g., a hard disk). Specifically, GPS receiver 210 may transmit location data (e.g., latitude, longitude, etc.) to CPU 202, memory 204, or non-volatile storage 206 in similar manners. In some embodiments, CPU 202 may comprise a field programmable gate array or customized application-specific integrated circuit.

In the illustrated embodiment, memory 204 may be configured to store one or more application such as a mapping application. In this embodiment, applications stored in memory 204 may be configured to perform the method described in more detail in connection with FIG. 5.

As illustrated in FIG. 2, the device 200 includes multiple network interfaces including cellular transceiver 212, wireless transceiver 214, and Bluetooth transceiver 216. As discussed in connection with FIG. 1, cellular transceiver 212 enables the device 200 to transmit event or location data, processed by CPU 202, to a server via a mobile or radio network. Additionally, CPU 202 may determine the format and contents of data transferred using cellular transceiver 212, wireless transceiver 214, and Bluetooth transceiver 216.

FIG. 3 is a logical block diagram illustrating a server device for presenting map labels according to some embodiments of the disclosure. As illustrated in FIG. 3, a device 300 includes a network interface 302, a user profile processor 304, a location processor 306, a user profile database 308, a map database 310, and a location database 312. Although illustrated as a single device, each of the components of device 300 may be located remote from one another (that is, each component may reside on a separate server).

System 300 includes a user profile processor 304. In one embodiment, user profile processor 304 may be configured to receive profile data from users via network interface 302. In one embodiment, user profile processor 304 may perform the method described in connection with FIG. 4, the description of which is incorporated by reference in its entirety. User profile processor 304 may further be configured to store user profile data in user profile database 308. In one embodiment, user profile processor 304 may comprise one or more server devices distributed in multiple locations or within a single location. In one embodiment, user profile database 308 may comprise one or more relational databases or non-relational database distributed in multiple locations or within a single location.

Figure 4:
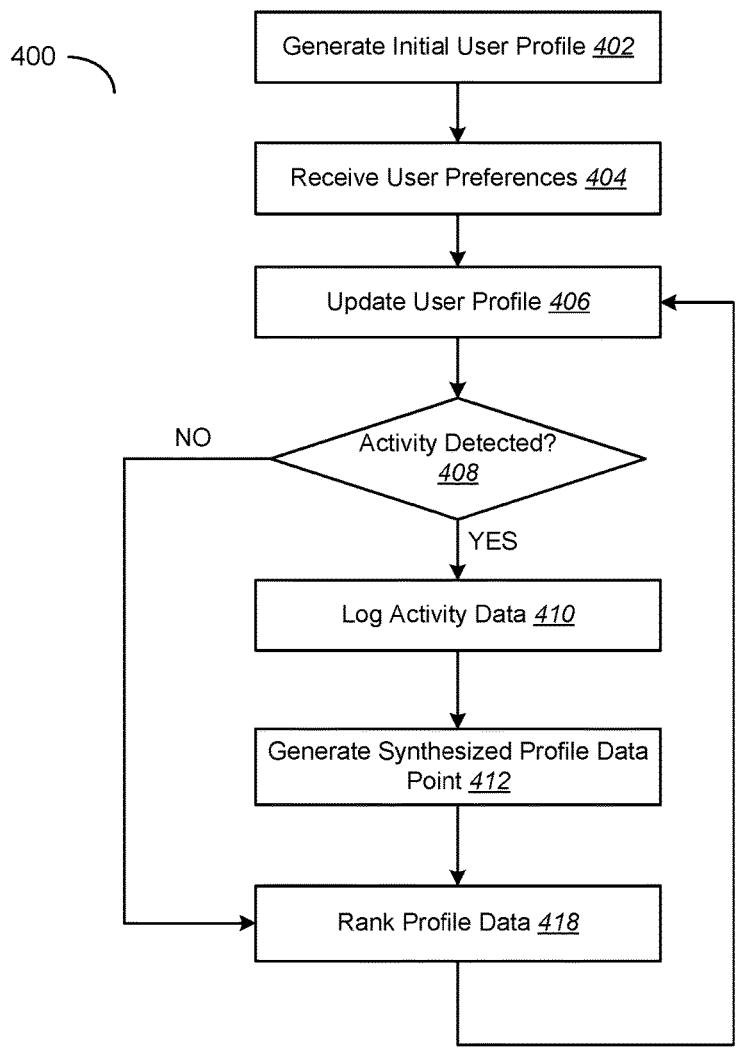
FIG. 4 is a flow diagram illustrating a method of generating a user profile according to some embodiments of the disclosure.

As discussed more fully in connection with FIG. 4, user profile processor 304 may receive user profile data (such as preferences, favorite stores, etc.) from a user and may store those preferences within a user account stored in user profile database 308. Additionally, user profile processor 304 may be configured to receive monitoring data from network interface 302 and may be configured to synthesize profile data based on the received monitoring data. For example, user profile processor 304 may receive browsing history data, deal or offer data (e.g., conversion of offers or deals transmitted to a user), event or sale data (e.g., events or sales attended by the user), transaction data, product interaction data, or location information from users via network interface 302.

System 300 includes a location processor 306. In one embodiment, location processor 306 may be configured to receive requests from users via network interface 302. In one embodiment, location processor 306 may perform the method described in connection with FIG. 5, the description of which is incorporated by reference in its entirety. In one embodiment, requests received by location processor 306 may include requests for map data and request for location data.

In response to a request for map data, location processor 306 may be configured to extract a geographic area from the request and retrieve one or more map tiles from map database 310. In one embodiment, map database 310 may comprise one or more relational databases or non-relational database distributed in multiple locations or within a single location. Alternatively, or in conjunction with the foregoing, map database 310 may include file storage for storing images representing map tiles. Location processor 306 may further be configured to transmit the map tiles to a user via network interface 302.

In response to a request for location data, location processor 306 may be configured to retrieve a list of locations from location database 312. In one embodiment, location database 312 may comprise one or more relational databases or non-relational database distributed in multiple locations or within a single location. For example, location database 312 may store a relational model of all locations associated with one or more shopping centers including data such as the location name, address, products sold, sales, deal or offer data, attendance at special or regular events, and other data relating to the location. Location processor 306 may further be configured to transmit location data to a user via network interface 302.

FIG. 4 is a flow diagram illustrating a method of generating a user profile according to some embodiments of the disclosure.

In step 402, the method 400 generates an initial user profile. In one embodiment, an initial user profile may be generated upon the registration of a user with a website or network-based service. For example, a mobile application or website may allow a user to register an account. During the process, the method 400 may automatically create a "blank" user profile for the user during the registration. Alternatively, the method 400 may present a plurality of questions to the user to generate initial data for the initial user profile. For example, the method 400 may request that upon registration the user identify one or more favorite stores or brands in order to seed an initial user profile with data.

In step 404, the method 400 receives user preferences. In one embodiment, receiving user preferences may comprise receiving an indication of user preferences explicitly from the user. For example, a user may add additional favorite stores to a user profile using a web or mobile interface. Likewise, a user may remove stores from a list of favorites or re-order stores within a list of favorite stores. Manual updates to user profiles may likewise adjust other types of data such as brands, locations, store sales, sale types, and other commercial data relevant to identifying a store that may be of interest to a user.

In step 406, the method 400 updates user profile data. In one embodiment, updating user profile data may comprise storing the updated user profile data within a database storing user profiles. In one embodiment, the method 400 may update the user profile in response to predefined events such as the detection of activity. Alternatively, the method 400 may update a user profile at predefined intervals. Alternatively, the method 400 may be configured to only update a profile at predefined intervals upon the detection of certain conditions. For example, the method 400 may update a user profile at predefined intervals upon determining that the user is within a predefined geo-fenced zone (e.g., a shopping mall).

In step 408, the method 400 detects whether user activity has occurred. If not, the method 400 proceeds to step 414 described herein. User activity generally may comprise any activity undertaken by a user that may be detected, for example, by a mobile or web-based application.

In one embodiment, user activity may comprise web browsing. For example, the method 400 may utilize cookies or other mechanism to track the browsing history of a user either on a retailer website or on third party websites. Alternatively, or in conjunction with the foregoing, the method 400 may utilize tracking pixels, advertisements, or other web-based mechanisms to track the browsing history of a user. In this embodiment, the method 400 may receive notifications of user browsing activities via a network connection.

Alternatively, or in conjunction with the foregoing, user activity may comprise viewing or interacting with products via a mobile application or website. In one embodiment, a website may be configured to monitor the sessions of users visiting the website. In this embodiment, the method 400 may receive notifications that a user has viewed a product, "liked" a product, shared a product via e-mail, SMS, or other means, or otherwise has interacted with a product.

Alternatively, or in conjunction with the foregoing, user activity may comprise changes in location detected via a GPS receiver or Bluetooth transceiver (e.g., via a beacon-based indoor positioning system, as described previously). In one embodiment, a user may be equipped with a mobile device such as the device illustrated in FIG. 2. In this embodiment, the mobile application may be configured to monitor a user's location. As one example, upon detecting that a user has entered a shopping center, the method 400 may be configured to periodically monitor the user's location within the shopping center. The method 400 may additionally record the amount of time a user is idle and the location (e.g., store) in which a user is idle. Alternatively, or in conjunction with the foregoing, the method 400 may monitor the time a user spends in a geo-fenced area, wherein the geo-fenced area corresponds to individual stores within the shopping center.

Alternatively, or in conjunction with the foregoing, the method 400 may also monitor user transactions. In this embodiment, the method 400 may be configured to detect when a user has made a purchase and may record the merchant name, product, amount spent, date, and other transactional data.

In step 410, the method 400 logs activity data if user activity has occurred. In one embodiment, the method 400 may log all activity data detected in step 408. The method 400 may store this information in a raw format for subsequent processing and or improving the operation of the method 400. In one embodiment, log activity may be stored in a flat file or in a database such as a relational database.

In step 412, the method 400 generates a synthesized profile data point. In one embodiment, generating a synthesized data point may comprise inspecting the log activity stored in step 410 and determining if a user profile may be updated based on the activity data. Thus, by generating a synthesized profile data point, the method 400 may update a user profile without the need for explicit user input.

If the detected activity is web browsing data, the method 400 may analyze the browsing data to determine, for example, the identities of retailers whose websites the user has visited and optionally, the frequency or amount of time the user spends on such sites. By analyzing this data, the method 400 may determine retailers that a user prefers that may not have been explicitly identified by the user. If the detected activity is product views, the method 400 may determine the identity of specific products, or product categories that a user prefers. If the detected activity is location data, the method 400 may determine the identity of retailers preferred by a user based on actual visits of the user. If the detected activity is transaction data, the method 400 may determine the identity of the merchant and the products purchased and may adjust the ranking of the merchant and products accordingly.

In step 414, the method 400 ranks (or re-ranks) profile data. In one embodiment, the method 400 uses the activity data to identify potential profile entries such as preferred stores, products, or product categories. The method 400 may compare the synthesized data points to explicit data points and may re-rank these data points when including the synthesized data points.

In order to further clarify the method 400, the following example of a hypothetical operation of method 400 is provided. The following example is intended to be illustrative only and should not be construed as limiting alternative embodiments of the method 400.

Upon registering an account a user may indicate a preference for Store A and Store B and may not provide any preferences regarding products or product categories. Further, the user may not provide any preference of Store A over Store B. As a non-limiting example, such a profile may store this information as follows:

| Stores      | Categories | Products |
|-------------|------------|----------|
| Store A (0) | n/a        | n/a      |
| Store B (0) |            |          |

During operation, the method 400 may monitor a user's browsing history and determine that the user spends a considerable amount of time on Store A's website. Conversely, the method 400 may determine that the user spends little time on Store B's website. Based on this activity data, the method 400 may rank Store A above Store B in the user profile. Additionally, the method 400 may determine that the user additionally spends a considerable amount of time at the website of Store C and may add Store C to the user's profile. Thus, a hypothetical user profile may be updated as follows:

| Stores       | Categories | Products |
|--------------|------------|----------|
| Store A (10) |            |          |
| Store B (5)  |            |          |
| Store C (1)  |            |          |

Additionally, the method 400 may monitor the users interactions with products (e.g., via mobile application or website). The method 400 may determine that the user often "likes" or bookmarks sporting goods products sold by Store C. The method 400 may then increase Store C's ranking above Store B due to the user's affirmative activities on Store C's website. The method 400 may leave Store A as higher ranked than Store C due to the user's explicit preference. Additionally, the method 400 may determine that the user's profile should include a preference for sporting goods versus other categories that the user spends less time viewing. Finally, the method 400 may inspect the products the user interacts with and may determine that the user primarily has interacted with surfboards sold by Store C. Accordingly, the method 400 may add a product identifier representing surfboards to the user profile. Thus, a hypothetical user profile may be updated as follows:

| Stores       | Categories     | Products  |
|--------------|----------------|-----------|
| Store A (10) | Sporting Goods | Surfboard |
| Store C (7)  |                |           |
| Store B (5)  |                |           |

Finally, the method 400 may monitor the location of the user when the user is shopping, for example, at a shopping center. The method 400 may determine based on the monitored location of the user that the users actually spends a considerable time at Store B when shopping, and spends no time at Stores A and C. In this example, the method 400 may then rank Store B higher than Stores A and C under the assumption that the user primarily shops online at Stores A and C but primarily shops in person at Store B. Thus, as will be described in connection with FIG. 5, Store B should have higher prominence in a map presentation. Additionally, the method 400 may receive notifications of items purchases at Store B which indicate the user has frequently purchased clothing at Store B, thus indicating a user's preference for clothing. Thus, a hypothetical user profile may be updated as follows:

| Stores      | Categories     | Products  |
|-------------|----------------|-----------|
| Store B (8) | Clothing       | Surfboard |
| Store A (6) | Sporting Goods |           |
| Store C (5) |                |           |

Upon executing the method 400, a system may include a plurality of user profiles that are updated in real-time or substantially real-time. Specifically, the method 400 enables a system to maintain a list of preferred locations (such as stores) for each user in the system. By using explicit and implicit data points, the method 400 allows for additional refinements of profile data.

Figure 5:
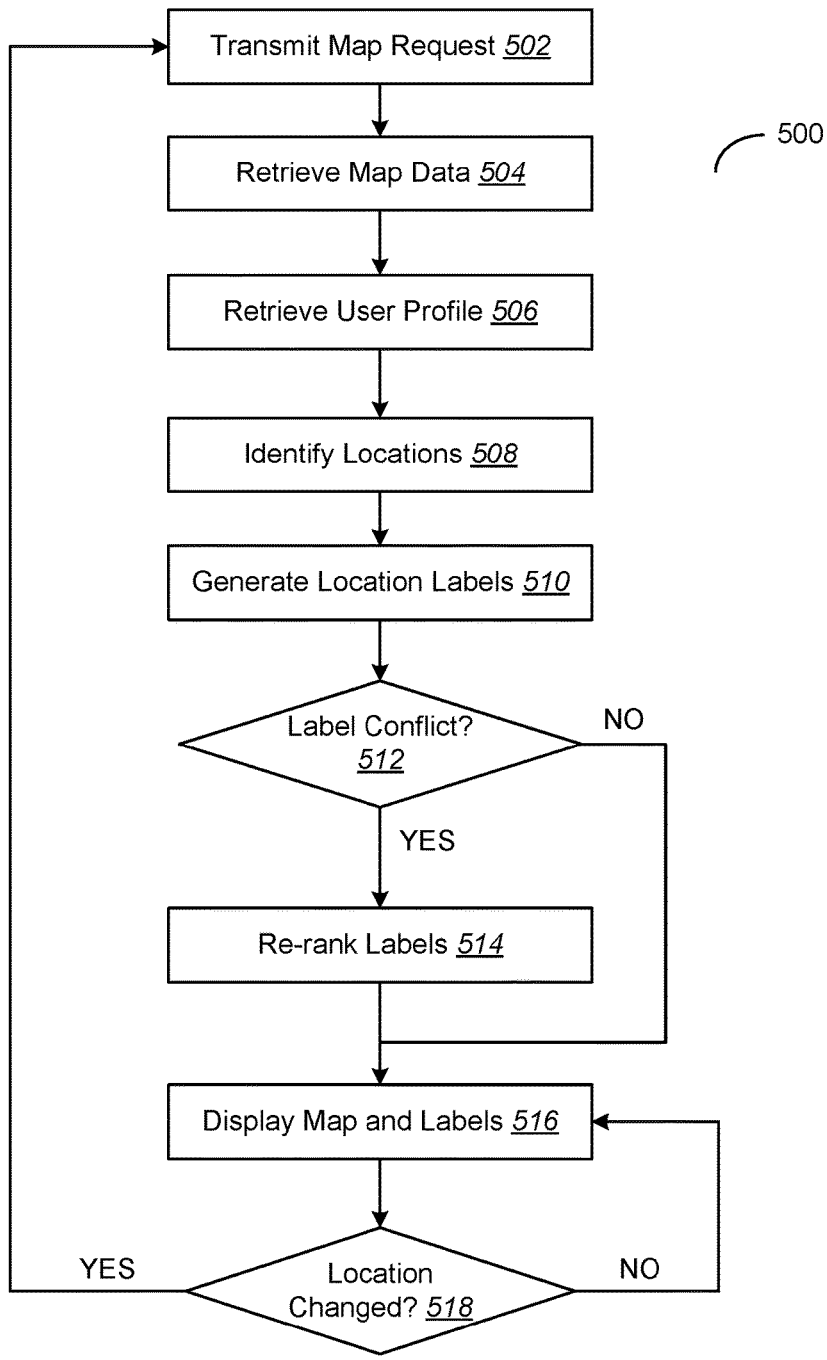
FIG. 5 is a flow diagram illustrating a method of generating a personalized map according to some embodiments of the disclosure.

FIG. 5 is a flow diagram illustrating a method of generating a personalized map according to some embodiments of the disclosure.

In step 502, the method 500 transmits a map request. In one embodiment, a map request may comprise an HTTP request transmitted by a mobile application. In one embodiment, a map request may be transmitted automatically when a user attempts to view a map, for example, on a mobile device. In one embodiment, a map request may include the location of the user determined by a GPS receiver or Bluetooth transceiver (e.g., via a beacon-based indoor positioning system, as described previously). In one embodiment, the map request may include the latitude, longitude, altitude, or, in specific embodiments, a floor level of a shopping center that the user is currently on.

In step 504, the method 500 retrieves map data. In one embodiment, retrieving map data may comprise receiving image data from a server in response to the map request transmitted in 502. For example, the method 500 may receive a plurality of "tiles" that represent a graphical depiction of a map. Alternatively, or in conjunction with the foregoing, the retrieving map data may comprise retrieving metadata associated with a map area. For example, the method 500 may retrieve structured data describing the map and/or locations on the map. In one embodiment, map data may be provided by the owner or operator of a retail center and may comprise a graphical map of a shopping center. In alternative embodiments, map data may be provided by a third party service and may comprise a graphical representation of a street map or topographical map.

In step 506, the method 500 retrieves user profile data. In one embodiment, the method 500 may receive a user profile generated using the method described in connection with FIG. 4. In one embodiment, the method 500 may receive the profile once and cache the profile on a mobile device. In some embodiments, the method 500 may subscribe to a server hosting the user profile data and received periodic notifications and/or updates to the user profile data when the user profile data is updated, for example, using the method described in connection with FIG. 4.

In step 508, the method 500 identifies one or more locations for presentation. In one embodiment, the method 500 may receive locations as part of receiving map data in step 504. For example, map data may include a structured data file containing information regarding locations within a visible map such as location names, addresses, and other data relevant to the locations. In some embodiments, location data may additionally include location-specific information such as the type of location (e.g., a store), goods sold, converted offers or deals, sales, or attendance at special or regular events, etc.

In alternative embodiments, the method 500 may not receive location data as part of the map data retrieved in step

504. In this embodiment, the method 500 may detect the location of the user and the area represented by map data and may initiate a separate request for location information. For example, in step 504 the method 500 may retrieve a set of map tiles associated with a limited display area. Additionally, the method 500 may retrieve a bounding box comprising geographic coordinates. Using these coordinates the method 500 may transmit a request for all location within those coordinates.

Alternatively, the method 500 may identify one or more locations in step 508 by querying a local database of known locations. For example, a mobile application may store on a mobile device a list of locations for a given area, such as a shopping center. In this embodiment, it may not be feasible to store all map tiles for every location, but may be practical to store textual information regarding the stores since such information may be compactly stored in a database such as a relational database. In this embodiment, the method 500 may utilize the coordinates of an area represented by the map data and may extract location information from local storage.

In step 510, the method 500 generates location labels for presentation. In one embodiment, generating location labels may comprise generating a string representation of a location identifier. For example, generating a label may comprise generating a substring of a location name.

In step 512, the method 500 determines if there is a label conflict. If not, the method 500 updates the map with labels in step 516 discussed herein.

In a simple scenario, the method 500 may be capable of displaying all generated labels on the displayed map area. For example, if the displayed map area only includes a single store, displaying the generated labels may simply comprise overlaying the single label on top of the displayed map area.

However, as discussed previously, conflicts may arise when the number of labels increases since the generated labels each of a fixed size and cannot overlap. In one embodiment, determining whether generated labels will overlap comprises calculating the coordinates and area of the label to be displayed. In one embodiment, the area of a generated label may comprise a rectangular area. After calculating the coordinates and area for each generated label the method 500 can then determine whether the areas of any one label overlaps the area of another. If so, the method 500 determines that there is a conflict and tags each label that overlaps another label as a conflicted label for further processing.

In step 514, the method 500 re-ranks labels if it determines there is a label conflict. As discussed with respect to step 512, the method 500 at step 514 may receive a set of labels including conflicted labels determined in step 512. For the conflicted labels, the method 500 must determine which of the labels to display and which to not display. Thus, in step 514 the method 500 re-ranks the labels in order to determine which label to display. In one embodiment, the method 500 may first rank all non-conflicted labels as the highest, since displaying the non-conflicted labels will not interfere with any other labels.

Next, the method 500 may rank the conflicted labels according to the user profile. As discussed in connection with FIG. 4, a user profile contains a list of locations and a ranking for each of those locations. Thus, the method 500 may use the user profile to rank the specific locations within the displayed map area. If the displayed map area contains locations that are not in the user profile, the method 500 may rank those below the locations within the user profile. The method 500 may additionally rank those locations not appearing in a user profile according to rankings across all profiles (e.g., a global ranking). Importantly, the method 500 may normalize the global rankings to ensure that locations not in the user profile do not outrank locations in the user profile.

In one embodiment, the method 500 may re-rank generated labels according to a best-fit algorithm. That is, the method 500 may rank generated labels such that the maximum number of labels may be displayed within the displayed map area. In this embodiment, the method 500 may iterate through each permutation of displayed labels and determine for each permutation whether a conflict still exists. The method 500 may then select the permutation that results in the most generated labels shown on the displayed map area. In the event of two or more permutations displaying the same amount of generated labels, the method 500 may select the permutation that contains the highest rated locations based on the user profile data.

Alternatively, the method 500 may re-rank generated labels according to a best-first algorithm, that is, showing as many highest rated locations as possible. In this embodiment, the method 500 may select the highest rated location and mark that location (and generated label) as non-conflicted. The method 500 may proceed to inspect the remaining generated labels (sorted by user profile rank) and attempt to mark the generated labels as non-conflicted (e.g., to be displayed). Notably, the method 500 may utilize the best-first algorithm in order to improve ranking speed given its linear complexity. Alternatively, or in conjunction with the foregoing, the method 500 may use any additional maximum coverage algorithm to determine which labels to display.

In step 516, the method 500 displays the map and labels. In one embodiment, displaying a map may comprise presenting the map data tiles on the screen of a mobile device or computer. In one embodiment, displaying labels may comprise displaying non-conflicted labels as an overlay on top of the map data tiles. In some embodiments, displaying a map and labels may further comprise hyperlinking generated labels to allow a user to view more details regarding the location represented by the generated labels.

In step 518, the method 500 determines if a user's location has changed. As discussed previously, the method 500 may be executed by a mobile application running on a mobile device. In one embodiment, the method 500 may, in the background, monitor the location of a user as the user changes locations. In one embodiment, detecting a change in location may comprise periodically monitoring the coordinates of a GPS receiver or Bluetooth transceiver (e.g., via a beacon-based indoor positioning system, as described previously).

If the method 500 determines that a user has not changed location the method 500 continues to display the map and labels in step 516. Alternatively, if the method 500 determines that a user has changed location, the method 500 may re-execute to update the map and labels based on the user's new location.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method for presenting map labels, the method comprising:
   receiving map data and location data;
   retrieving a user profile, the user profile containing user preference data specifying a ranked list of locations;
   generating a plurality of labels, wherein the plurality of labels comprise labels associated with a subset of locations within the ranked list of locations from the user profile;
   identifying a plurality of conflicting labels within the labels, wherein the conflicting labels overlap when displayed;
   ranking the labels based on the user profile to generate a ranked label subset, wherein the ranked label subset exclude some of the conflicting labels based on the ranked list of locations from the user profile so as to result in the subset having no conflicting labels that overlap when displayed; and
   displaying the map data and the ranked label subset on a device associated with the user profile.

2. The method of claim 1 further comprising:
   receiving second map data and location data;
   retrieving a second user profile that does not contain user preference data specifying a ranked list of locations;
   generating a plurality of second labels;
   identifying a plurality of second conflicting labels within the second labels, wherein the conflicting labels overlap when displayed;
   ranking the second labels based on a ranked list of locations from a plurality of other user profiles to generate a second ranked label subset, wherein the second ranked label subset exclude some of the second conflicting labels based on the ranked list of locations from the other user profiles so as to result in the second ranked label subset having no conflicting labels; and
   displaying the second map data and the second ranked label subset.

3. The method of claim 1 further comprising, prior to retrieving the user profile:
   generating an initial user profile;
   receiving user preference data specifying an initial ranked list of locations and updating the initial user profile to include the received user preference data to generate the user profile;
   receiving activity data for a user associated with the user profile;
   generating a synthesized profile data that includes the user preference data specifying the ranked list of locations based on the activity data; and
   updating the initial ranked list of locations of the user profile with the ranked list of locations of the synthesized profile data.

4. The method of claim 3 wherein the activity data comprises data relating to the ranked list of locations, which is associated with one of web browsing of the user, interactions of the user with products, transactions of the user, and movements of the user.

5. The method of claim 4 wherein generating a synthesized profile data based on the activity data comprises analyzing the activity data to identify the ranking of locations associated with the activity data, wherein the ranked list of locations at least partially reorders and/or overwrites the initial ranked list of locations.

6. The method of claim 5 wherein analyzing the activity data comprises determining relative time spent by the user at websites for a plurality of retailers that are also associated with a plurality of physical locations.

7. The method of claim 1 wherein ranking of the one or more labels includes ranking non-conflicting labels higher than the conflicting labels.

8. The method of claim 1 wherein ranking is performed according to a best-fit algorithm.

9. A system for presenting map labels, the system comprising:
   one or more processors; and
   a non-transitory memory storing computer-executable instructions therein that, when executed by the processors, cause the system to:
      receive map data and location data;
      retrieve a user profile, the user profile containing user preference data specifying a ranked list of locations;

generate a plurality of labels, wherein the plurality of labels comprise labels associated with a subset of locations within the ranked list of locations from the user profile;

identify a plurality of conflicting labels within the labels, wherein the conflicting labels overlap when displayed;

rank the labels based on the user profile to generate a ranked label subset, wherein the ranked label subset exclude some of the conflicting labels based on the ranked list of locations from the user profile so as to result in the subset having no conflicting labels that overlap when displayed; and display the map data and the ranked label subset on a device associated with the user profile.

10. The system of claim 9 wherein the instructions, when executed by the processors, being further configured to cause the system to receive second map data and location data;

retrieve a second user profile that does not contain user preference data specifying a ranked list of locations;

generate a plurality of second labels;

identify a plurality of second conflicting labels within the second labels, wherein the conflicting labels overlap when displayed;

rank the second labels based on a ranked list of locations from a plurality of other user profiles to generate a second ranked label subset, wherein the second ranked label subset exclude some of the second conflicting labels based on the ranked list of locations from the other user profiles so as to result in the second ranked label subset having no conflicting labels; and display the second map data and the second ranked label subset on a device of the second user profile.

11. The system of claim 9, prior to retrieving the user profile, the non-transitory memory storing computer-executable instructions, when executed by the processors, being further configured to cause the system to:

generate an initial user profile;

receive user preference data specifying an initial ranked list of locations and update the initial user profile to include the received user preference data to generate the user profile;

receive activity data for a user associated with the user profile;

generate a synthesized profile data that includes the user preference data specifying the ranked list of locations based on the activity data; and update the initial ranked list of locations of the user profile with the ranked list of locations of the synthesized profile data.

12. The system of claim 11 wherein the activity data comprises data relating to the ranked list of locations, which is associated with one of web browsing of the user, interactions of the user with products, transactions of the user, and movements of the user.

13. The system of claim 12 wherein generating a synthesized profile data based on the activity data comprises analyzing the activity data to identify the ranking of locations associated with the activity data, wherein the ranked list of locations at least partially reorders and/or overwrites the initial ranked list of locations.

14. The system of claim 13 wherein analyzing the activity data comprises determining relative time spent by the user at websites for a plurality of retailers that are also associated with a plurality of physical locations.

15. The system of claim 9 wherein ranking of the one or more labels includes ranking non-conflicting labels higher than the conflicting labels.

16. The system of claim 9 wherein ranking the labels is performed according to a best-fit algorithm.

* * * * *